United States Patent
Zeuch et al.

(10) Patent No.: US 9,748,798 B2
(45) Date of Patent: Aug. 29, 2017

(54) CONTROL MODULE FOR AN ELECTRICAL ENERGY ACCUMULATOR, ENERGY ACCUMULATOR UNIT HAVING SUCH A CONTROL MODULE, UNINTERRUPTIBLE POWER SUPPLY UNIT AND METHOD FOR OPERATING A CONTROL MODULE

(71) Applicant: Phoenix Contact GMBH & Co. KG, Blomberg (DE)

(72) Inventors: Jochen Zeuch, Blomberg (DE); Michael Heinemann, Lage (DE); Hartmut Henkel, Blomberg (DE)

(73) Assignee: PHOENIX CONTACT GMBH & CO. KG, Blombert (DE)

( * ) Notice: Subject to any disclaimer, the term of this patent is extended or adjusted under 35 U.S.C. 154(b) by 395 days.

(21) Appl. No.: 14/382,296

(22) PCT Filed: Mar. 1, 2013

(86) PCT No.: PCT/EP2013/054193
§ 371 (c)(1),
(2) Date: Aug. 29, 2014

(87) PCT Pub. No.: WO2013/128008
PCT Pub. Date: Sep. 6, 2013

(65) Prior Publication Data
US 2015/0028680 A1    Jan. 29, 2015

(30) Foreign Application Priority Data
Mar. 2, 2012    (DE) ........................ 10 2012 101 769

(51) Int. Cl.
*G05F 1/66*    (2006.01)
*H02J 9/06*    (2006.01)
(Continued)

(52) U.S. Cl.
CPC .................. *H02J 9/06* (2013.01); *G05F 1/66* (2013.01); *H01M 10/425* (2013.01);
(Continued)

(58) Field of Classification Search
USPC ........................................... 307/66
See application file for complete search history.

(56) References Cited

U.S. PATENT DOCUMENTS

| | | | |
|---|---|---|---|
| 5,295,078 A * | 3/1994 | Stich ........................ | H02J 9/062 320/136 |
| 5,315,533 A | 5/1994 | Stich et al. | |
| 2010/0156183 A1* | 6/2010 | Kah ...................... | G05B 19/042 307/66 |

FOREIGN PATENT DOCUMENTS

| | | | |
|---|---|---|---|
| CN | 101599654 | * | 12/2009 |
| CN | 101599654 A | | 12/2009 |
| DE | 69212894 T2 | | 4/1997 |

OTHER PUBLICATIONS

Quint-UPS/24DC/24DC/20, Nov. 7, 2011; 28 pages.
Office Action dated Dec. 30, 2015 in Chinese Application No. 201380012110.3 (with English Translation).

* cited by examiner

*Primary Examiner* — Rexford Barnie
*Assistant Examiner* — Xuan Ly
(74) *Attorney, Agent, or Firm* — Knobbe, Martens, Olson & Bear LLP

(57) ABSTRACT

The invention relates to a control module for an electric energy store for operation on a supply line, which is configured for the parallel connection of a plurality of consumers, comprising a supply terminal for connection to the supply line, and comprising a control unit for the controlled charging and/or discharging of an electric energy store via the supply terminal, wherein the control module is con-
(Continued)

Figure 1:
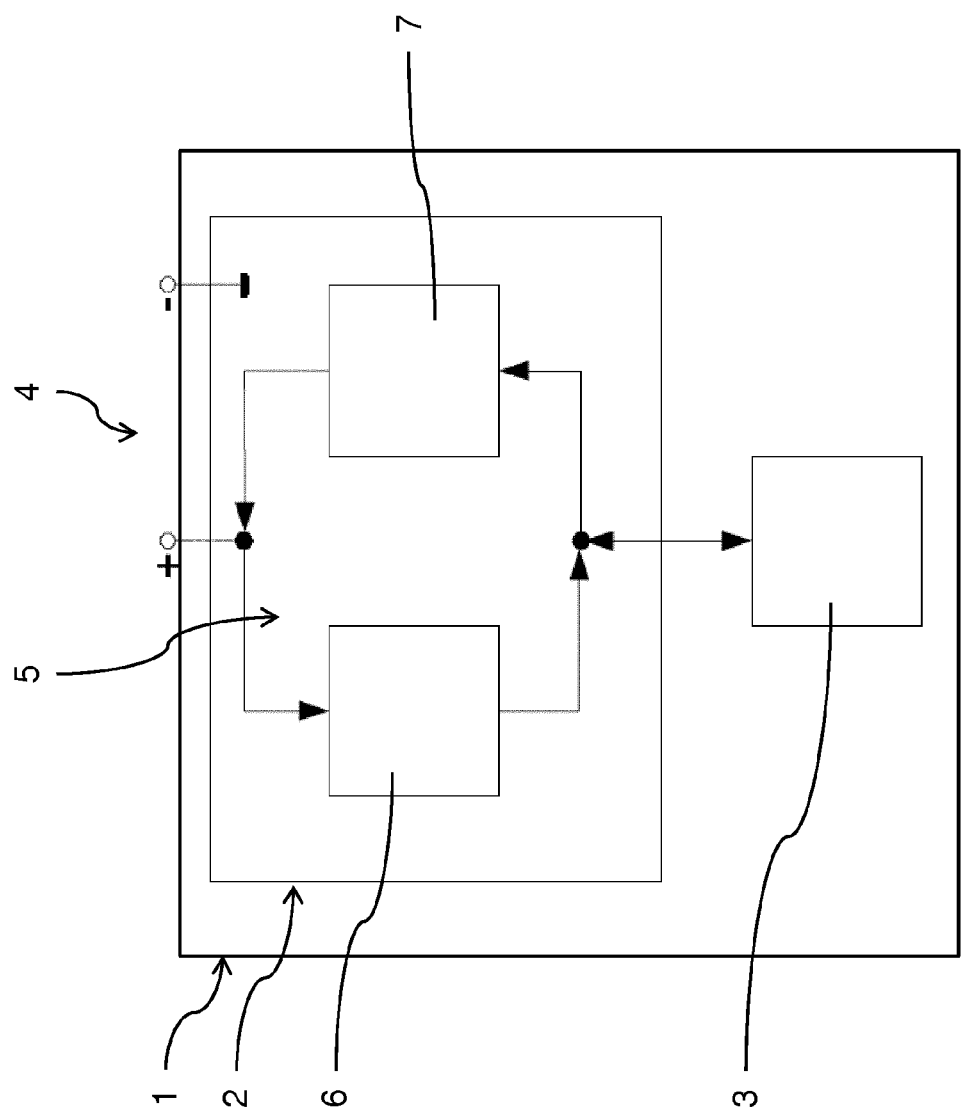

nected or can be connected to the electric energy store, the control module can be connected to a delimiting device, and the control unit is configured, when the control module is connected to the delimiting device, to perform a rapid charging and/or a rapid discharging of the energy store.

20 Claims, 2 Drawing Sheets

(51) Int. Cl.
     *H01M 10/46*      (2006.01)
     *H01M 10/42*      (2006.01)
     *H02J 7/00*      (2006.01)

(52) U.S. Cl.
     CPC ............... *H01M 10/46* (2013.01); *H02J 7/00* (2013.01); *H02J 2007/0001* (2013.01); *Y10T 307/625* (2015.04)

CONTROL MODULE FOR AN ELECTRICAL ENERGY ACCUMULATOR, ENERGY ACCUMULATOR UNIT HAVING SUCH A CONTROL MODULE, UNINTERRUPTIBLE POWER SUPPLY UNIT AND METHOD FOR OPERATING A CONTROL MODULE

REFERENCE TO RELATED APPLICATIONS

This application is the U.S. National Phase of International Application PCT/EP2013/054193, filed Mar. 1, 2013, and claims priority to DE Application No 10 2012 101 769.7, filed Feb. 3, 2012. Each of the priority applications is hereby incorporated by reference in its entirety.

FIELD

The present invention relates to a control module for an electric energy store for operation on a supply line, which is configured for the parallel connection of a plurality of consumers, comprising a supply terminal for connection to the supply line, and comprising a control unit for the controlled charging and/or discharging of an electric energy store via the supply terminal, wherein the control module is connected or can be connected to the electric energy store. The invention also relates to a method for operating such a control module. The present invention also relates to an energy store unit comprising an electric energy store and an aforementioned control module. The present invention further relates to an uninterruptible power supply device comprising an energy store and an aforementioned control module.

BACKGROUND

The aforementioned control module is used for example in energy store units, which are also referred to as complex energy stores, in order to control the charging and/or discharging of the energy store. To this end, the control module comprises a control unit, which charges the energy store from the connected supply line and, when the energy store unit operates at least one consumer, controls the discharging of the energy store. Here, the control unit delimits input and output variables, which may be dependent on the use of the energy store unit and on the used energy store. The input and output variables comprise a current and a voltage, which are applied across the supply terminal of the control module. If the energy store is configured separately from the control module, the control module may be configured to perform only the charging or discharging of the energy store. Depending on the size and type of energy store, the energy store can be formed differently depending on the environmental conditions, in particular an ambient temperature.

An uninterruptible power supply device also comprises an accordingly formed control module. The function of the control module is substantially as described above for the energy store unit, wherein the control module is configured to perform both the charging and the discharging of the energy store. The control module is additionally configured, in the event of failure of an energy source feeding the supply line, to provide energy from the energy store in order to ensure the operation of consumers connected to the supply line. To this end, the control unit of the control module is configured to monitor current and/or voltage across the supply terminal and, in the event of a failure of the energy source, to feed energy from the energy store into the supply line via the supply terminal with a short time delay.

In order to be able to use the energy store unit as universally as possible, the control unit is configured to charge the energy store with a relatively low current over a long time. Here, further consumers connected to the supply line are supplied simultaneously with energy via the supply line. Due to the low current for charging the energy store, the energy source feeding the supply line is prevented from being overloaded, even with a plurality of consumers connected in parallel, or the need to provide an energy source of large dimensions in order to provide large currents for the rapid charging of the energy store is eliminated. Accordingly, when discharging, it is necessary to delimit current and/or voltage in order to prevent damage to the energy store and the control module when there is a multiplicity of consumers to be supplied.

SUMMARY

One object of the present invention is therefore to improve the control module, the method, the energy store unit and the uninterruptible power supply device known in the prior art to the extent that they enable rapid charging of the energy store on an arbitrary supply line with an arbitrary number of parallel consumers with high supply reliability. A further object of the present invention is to improve the control module, the method, the energy store unit and the uninterruptible power supply device to the extent that, when discharging, a universal supply of arbitrary consumers is enabled with high operating reliability.

The object is achieved in accordance with the invention by the features of the independent claims. Advantageous embodiments of the invention are specified in the dependent claims.

In accordance with the invention, the object is achieved by a control module for an electric energy store for operation on a supply line, which is configured for the parallel connection of a plurality of consumers, comprising a supply terminal for connection to the supply line, and comprising a control unit for the controlled charging and/or discharging of an electric energy store via the supply terminal, wherein the control module is connected or can be connected to the electric energy store, and wherein the control module can be connected to a delimiting device, and the control unit is configured, when the control module is connected to the delimiting device, to perform a rapid charging and/or a rapid discharging of the energy store.

The object is further achieved by a method for operating a control module for an electric energy store on a supply line, which is configured for the parallel connection of a plurality of consumers, wherein the control module is connected or can be connected to the electric energy store, comprising the steps of checking a connection between the control module and a delimiting device and performing a rapid charging and/or a rapid discharging of the energy store when the control module is connected to the delimiting device.

The object is also achieved by an energy store unit comprising an energy store and an aforementioned control module.

Furthermore, the object is achieved by an uninterruptible power supply device comprising an energy store and an aforementioned control module, wherein the control module is configured to charge and discharge the energy store for the uninterruptible power supply of at least one consumer connected to the supply line.

The basic concept of the present invention is therefore to configure the control unit in such a way that it can be used in a normal operating mode without the connection to the delimiting device, as known in the prior art, whereas the control unit, when the control module is connected to the delimiting device, changes into another operating mode, referred to hereinafter as the rapid mode, in which it performs a rapid charging and/or a rapid discharging. Here, the charging and discharging are independent of one another in principle, such that the control module can be configured merely to charge or to discharge. However, the control module is preferably configured to charge and discharge the electric energy store. The energy store is accordingly a rechargeable energy store. Alternatively, a non-rechargeable energy store can also be used, for example a battery. In this case, the control module is limited to the discharging function. The switchover between the two modes can be performed in different ways. By way of example, the control module may have a mechanical or electrical switch for switching over, or the switchover is performed by a software configuration. The charging or discharging occurs in accordance with the respective current operation of the control module and of the energy store. The rapid charging or rapid discharging is accordingly only performed when the energy store is to be charged or energy is to be output therefrom. For the rest, the energy store is neither charged nor discharged. The delimiting device here delimits current and/or voltage across the supply terminal in accordance with the current operation of the control module or of the energy store. During charging, the maximum charging current for example is delimited by the delimiting device in order to ensure that an energy source operating the supply line can reliably operate further consumers connected to the supply line. Here, a current reserve of the energy source can be used to increase the charging current in order to perform a rapid charging. During discharging, the delimiting device for example acts in order to delimit a discharging current of the energy store, such that this energy store or the control module is not damaged or destroyed by the discharging. A delimitation to minimum current or voltage values can also be performed during discharging of the energy store via the delimiting device. In both modes of operation, it may be necessary to adapt parameters to one another, such as switching thresholds or switching times of the control unit and of the energy store. The energy source is preferably configured as a direct current source.

The energy store unit comprises the energy store in addition to the control module. Depending on the size and type of the energy store, the energy store can be configured differently depending on the environmental conditions, in particular an ambient temperature. The energy store is preferably an exchangeable component of the energy store unit.

An uninterruptible power supply device also comprises a control module as formed previously, which is configured to perform both the charging and the discharging of the energy store in order to provide energy from the energy store in the event of failure of the energy source feeding the supply line. Accordingly, the control unit of the control module is configured to monitor current and/or voltage across the supply terminal and, in the event of failure of the energy source, to feed energy from the energy store into the supply line via the supply terminal with a short time delay. The energy store and the control module are preferably configured as separate components. By way of example, the energy store can thus be exchanged easily, for example in the event of damage or in order to perform a separate charging. Alternatively, the energy store and the control module may form an integral unit, which facilitates the handling of the uninterruptible power supply device.

In accordance with an advantageous embodiment of the invention, the control unit comprises a switch, which is arranged between the supply terminal and the energy store, wherein the control module is configured when producing a connection between the control module and the delimiting device to connect the supply terminal to the energy store by closing the switch, and, when the connection is cancelled, to separate the supply terminal from the energy store by opening the switch. The switch causes the control unit to become substantially functionless when the control module is connected to the delimiting device, since a direct connection from the supply terminal to the energy store is produced.

In accordance with an advantageous embodiment of the invention, the switch comprises a mechanical switch, in particular a relay. This enables a reliable switching with low losses in the switch. Switching times of the mechanical switch or of the relay are largely uncritical, since a switchover of the operating mode is not time-critical.

In accordance with an advantageous embodiment of the invention, the switch comprises a semiconductor switch, which is configured with at least one bipolar transistor, a field-effect transistor or an insulated gate bipolar transistor. Semiconductor switches are particularly small and can be actuated with low switching currents. Where necessary, short switching times can be implemented.

In accordance with an advantageous embodiment of the invention, the switch is configured as a unidirectional switch. Accordingly, the switch may enable merely a rapid charging or a rapid discharging. The respective other function is also performed with connection of the control module to the delimiting device in the normal operating mode.

In accordance with an advantageous embodiment of the invention, the energy store is a chemical energy store, in particular a lead battery or an NiMh battery, or comprises a capacitor module. Energy stores of this type are rechargeable and are therefore suitable both for an energy store unit and for an uninterruptible power supply device. They can be selected in accordance with their properties depending on the purpose of use. Chemical energy stores are usually associated with low costs and can be easily handled. Alternatively or additionally, the energy store may comprise at least one capacitor, in particular an electrolyte capacitor or a double-layer capacitor. The capacitor module particularly preferably comprises a plurality of capacitors of this type. Capacitors or capacitor modules are well suited for a rapid charging or discharging, without occurrence of relevant ageing effects.

In accordance with a further advantageous embodiment of the invention, the control module comprises an automatic actuation apparatus, wherein an actuation occurs when the control module is connected to the delimiting device, and the control unit is configured, upon actuation of the actuation apparatus, to perform a rapid charging and/or a rapid discharging of the energy store. It is ensured as a result of the automatic actuation that the control module automatically switches into the rapid mode as soon as the connection to the delimiting device is produced. By cancelling the connection, that is to say by separating the delimiting device from the control module, the control module is preferably switched back in the normal operating mode. The use of the normal operating mode when the control module is connected to the delimiting device is thus prevented, as is the execution of a rapid charging or rapid discharging without delimiting device. Damage to the energy store and/or the control module caused by incorrect operation is thus prevented.

In accordance with a further advantageous embodiment of the invention, the actuation apparatus comprises a mechanical actuation element, which is configured in such a way that it is mechanically actuated by the connection of the control module to the delimiting device. The actuation element is configured and positioned in order to be mechanically actuated by a corresponding actuator of the delimiting device.

In accordance with a further advantageous embodiment of the invention, the actuation apparatus comprises an electric actuation element, which is configured in such a way that it is electrically actuated by the connection of the control module to the delimiting device. The electric actuation element can be provided for example by two contacts, which are arranged on an outer wall of the control module. The contacts are configured and positioned in order to be electrically actuated by a corresponding actuator of the delimiting device. By way of example, the contacts, upon connection to the delimiting device, can be bridged thereby. Due to the production of the conductive connection between the two contacts, the control module can detect the connection to the delimiting device and can switch between the modes.

In accordance with a further advantageous embodiment of the invention, the actuation apparatus comprises a data interface and is configured to receive from a corresponding interface of the delimiting device a signal via the interface when the control module is connected to the delimiting device. The connection of the delimiting device to the control module can thus be signalled via the data interface. In an advantageous development, the type of delimiting device can be signalled, such that, with a plurality of connectable delimiting devices, only the connection to a suitable delimiting device triggers an actuation. The removal of the delimiting device can also be signalled accordingly.

In accordance with an advantageous embodiment of the invention, the control unit is configured to prevent a deep discharge of the energy store. The deep discharge may cause damage to the energy store, which is to be avoided. With avoidance of the deep discharge, the energy store has a residual energy quantity, such that the control module can continue to be fed thereby. For example, in the case of the uninterruptible power supply device, the UPS operation can thus be interrupted in good time, such that the control module can further perform a signalling or a communication with an external device. By way of example, the control unit changes into the normal operating mode in order to prevent a further discharge.

In accordance with an advantageous embodiment of the invention, the uninterruptible power supply device comprises a delimiting device, wherein the delimiting device is configured for the automatic actuation of the actuation apparatus upon connection to the control module. This enables the uninterruptible power supply to operate efficiently on the supply line. A corresponding combination with the delimiting device is also possible in principle for the energy store unit.

The invention will be explained hereinafter in greater detail with reference to the accompanying drawing on the basis of preferred embodiments.

BRIEF DECRIPTION OF DRAWINGS

Figure 2:
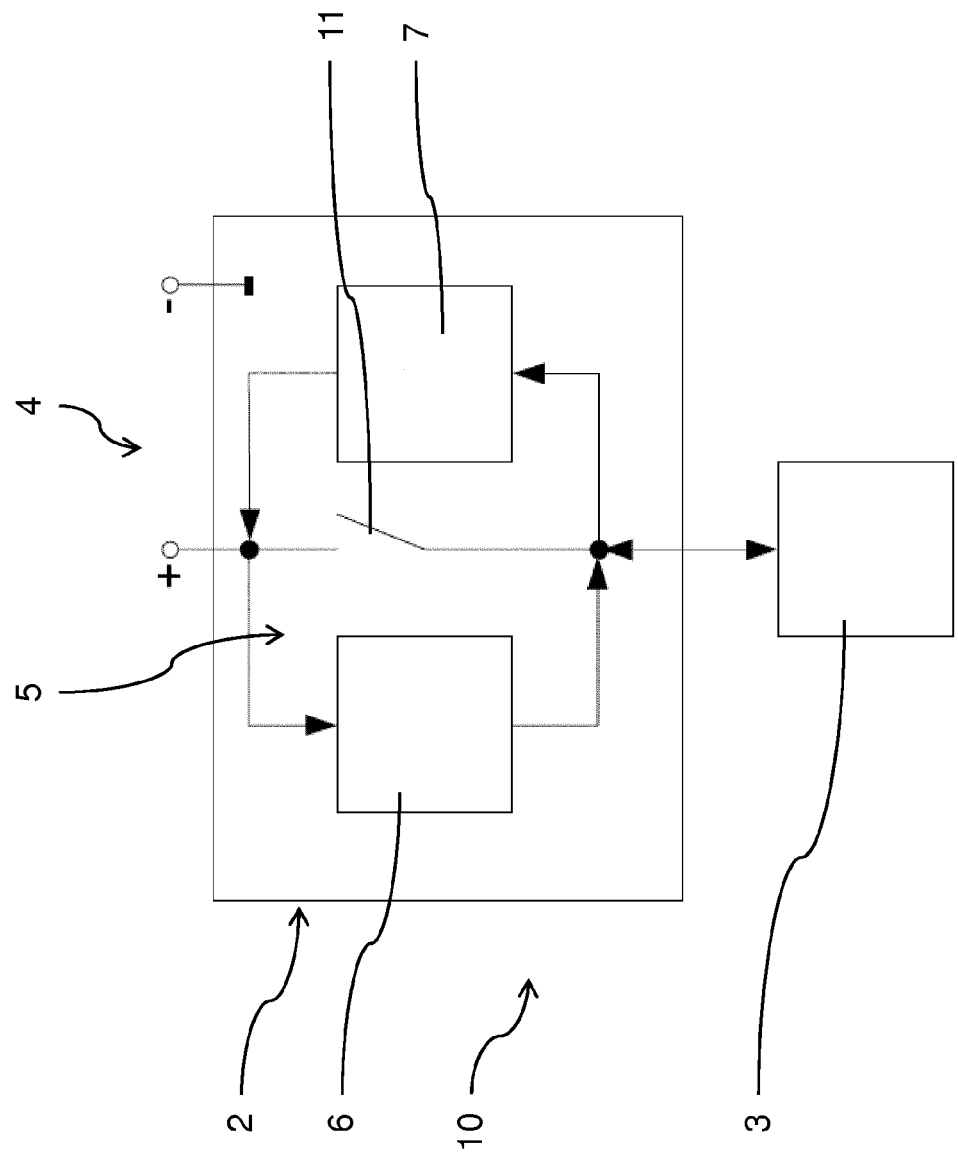

FIG. 1 shows a basic circuit diagram of an energy store unit in accordance with a first embodiment of the invention, and FIG. 2 shows a basic circuit diagram of an uninterruptible power supply device in accordance with a second embodiment of the invention.

DETAILED DESCRIPTION

FIG. 1 shows an energy store unit 1 in accordance with a first embodiment of the invention. The energy store unit 1 comprises a control module 2 and an energy store 3, which is configured in this exemplary embodiment as a nickel-metal hydride battery. The control module 2 and energy store 3 are integral parts of the energy store unit 1.

The control module 2 is configured for connection to a supply line (not shown here) for the parallel connection of a plurality of consumers (not illustrated). The control module 2 comprises a supply terminal 4 for connection to the supply line. Furthermore, the control module 2 comprises a control unit 5 with a charging unit 6 and a discharging unit 7, which are configured separately in this exemplary embodiment. The charging unit 6 is configured for the controlled charging of the electric energy store 3 via the supply terminal 4 with a delimited current. The discharging unit 7 is configured for the controlled discharging of the energy store 3 via the supply terminal 4.

The energy store unit 1 can be connected via the control module 2 to a delimiting unit. The control module 2 comprises an automatic actuation apparatus, which is not shown in FIG. 1 and which can be attached at an arbitrary point of the housing of the energy store unit 1. The actuation apparatus is configured and arranged in such a way that an actuation occurs automatically when the control module 2 is connected to the delimiting device. To this end, the actuation apparatus comprises a mechanical actuation element, which is automatically actuated by a corresponding actuator of the delimiting device upon connection.

The control unit 5 is configured, upon actuation of the actuation apparatus, to change from its normal operating mode for controlled charging and discharging into a rapid mode in which it performs a rapid charging and a rapid discharging of the energy store 3. The control unit 5 is further configured to prevent a deep discharge of the energy store 3 by monitoring the energy store 3 and separating it from the supply terminal 4 where appropriate.

The method for operating the control module 2 thus ensures that a connection between the control module 2 and the delimiting device is checked. In a further step, when the control module 2 is connected to the delimiting device, a rapid charging and a rapid discharging are performed, for which purpose a switch is made from the normal mode to the rapid mode.

FIG. 2 shows an uninterruptible power supply device 10 in accordance with a second embodiment of the present invention. Essential elements of the uninterruptible power supply device 10 correspond to those of the energy store unit 1 of the first embodiment, such that the same reference signs are used for matching components and a repeated description is spared.

The uninterruptible power supply device 10, similarly to the previously described energy store unit 1, comprises a control module 2 and an energy store 3, which can be interconnected. Accordingly, a simple exchange of the energy store 3 of the uninterruptible power supply device 10 can be performed. The energy store 3 is configured in this exemplary embodiment as a lead battery.

The control module 2 comprises a control unit 5 with a charging unit 6 and a discharging unit 7, as described previously with reference to the energy store unit 1. In addition, the control unit 5 of the uninterruptible power supply device 10 comprises a switch 11, which is arranged between the supply terminal 4 and the energy store 3. The switch 11 is configured in this exemplary embodiment as a relay, which constitutes a bidirectional mechanical switch. When the relay 11 is closed, a current flow is possible between the energy store 3 and the supply terminal 4 in both directions.

In an alternative embodiment, the switch 11 comprises a semiconductor switch, which, with at least one bipolar transistor, a field-effect transistor or an insulated gate bipolar transistor (IGBT), is configured as a unidirectional switch, in order to enable merely a rapid charging of the energy store 3 when connected to the delimiting device.

Similarly to the previously described energy store unit 1, the control module 2 of the uninterruptible power supply device 10 comprises an actuation apparatus, which in this exemplary embodiment comprises an electric actuation element. The actuation apparatus comprises two electric contacts, which are short-circuited by the connection of the control module 2 to the delimiting device by a bridge formed on the delimiting device. The actuation apparatus is thus actuated. Due to the actuation, the control module 2 closes the switch 11, and there is a switch from the normal operating mode into the rapid mode. When the connection is cancelled, the short circuit of the two contacts of the actuation apparatus is cancelled accordingly, whereupon the control module 2 opens the switch 11 in order to change from the rapid mode into the normal operating mode.

The uninterruptible power supply device 10 differs in terms of its function from the energy store unit 1 in that the control module 2 for charging and discharging the energy store 3 is configured for the uninterruptible power supply of at least one consumer connected to a supply line. This enables a rapid change between an operation for charging or discharging the energy store 3 in order to ensure the uninterruptible supply of the consumers.

The method for operating the control module 2 in this embodiment is identical to that described previously.

In an alternative embodiment of the uninterruptible power supply device 10, the uninterruptible power supply device 10 comprises the delimiting device. The delimiting device, as previously described, is configured for the automatic actuation of the actuation apparatus when connected to the control module 2. Accordingly, the uninterruptible power supply device 10 of the alternative embodiment is used continuously in the rapid mode.

List of Reference Signs energy store unit 1
control module 2
energy store 3
supply terminal 4
control unit 5
charging unit 6
discharging unit 7
uninterruptible power supply device 10
switch, relay 11

What is claimed is:

1. A control module for an electric energy store for operation on a supply line, which is configured for the parallel connection of a plurality of consumers, comprising:
a supply terminal for connection to the supply line, and comprising
a control unit for the controlled charging and/or discharging of an electric energy store via the supply terminal,
wherein
the control module is connected or can be connected to the electric energy store,
characterised in that,
the control module can be connected to a delimiting device configured to:
during charging, limit a charging current from the supply line such that an energy source operating the supply line can reliably operate each of the plurality of consumers; and
during discharging, limit a discharging current of the energy store, and
the control unit is configured, when the control module is connected to the delimiting device, to perform a rapid charging and/or a rapid discharging of the energy store.

2. The control module according to claim 1, characterised in that, the control unit comprises a switch, which is arranged between the supply terminal and the energy store, wherein the control module is configured, when a connection is produced between the control module and the delimiting device, to connect the supply terminal to the energy store by closing the switch, and, when the connection is cancelled, to separate the supply terminal from the energy store by opening the switch.

3. The control module according to claim 2, characterised in that the switch comprises a mechanical switch, in particular a relay.

4. The control module according to claim 2, characterised in that the switch comprises a semiconductor switch, which is configured with at least one bipolar transistor, a field-effect transistor or an insulated gate bipolar transistor.

5. The control module according to claim 4, characterised in that the switch is configured as a unidirectional switch.

6. The control module according to claim 1, characterised in that the energy store comprises a chemical energy store, in particular a lead battery or an NiMH battery, or a capacitor module.

7. The control module according to claim 1, characterised in that the control module comprises an automatic actuation apparatus, wherein an actuation occurs upon connection of the control module to the delimiting device, and the control unit is configured, upon actuation of the actuation apparatus, to perform a rapid charging and/or a rapid discharging of the energy store.

8. The control module according to claim 7, characterised in that the actuation apparatus comprises a mechanical actuation element, which is configured in such a way that it is mechanically actuated by the connection of the control module to the delimiting device.

9. The control module according to claim 7, characterised in that the actuation apparatus comprises an electric actuation element, which is configured in such a way that it is electrically actuated by the connection of the control module to the delimiting device.

10. The control module according to claim 7, characterised in that the actuation apparatus comprises a data interface and is configured to receive from a corresponding interface of the delimiting device a signal via the interface when the control module is connected to the delimiting device.

11. The control module according to claim 1, characterised in that the control unit is configured to prevent a deep discharge of the energy store.

12. A method for operating a control module for an electric energy store on a supply line, which is configured for the parallel connection of a plurality of consumers, wherein the control module is connected or can be connected to the electric energy store, comprising the steps of:
- checking a connection between the control module and a delimiting device,
- performing a rapid charging and/or a rapid discharging of the energy store when the control module is connected to the delimiting device,
- during charging, limiting a charging current from the supply line such that an energy source operating the supply line can reliably operate each of the plurality of consumers, and
- during discharging, limit a discharging current of the energy store.

13. An energy store unit comprising an electric energy store and a control module according to claim 1.

14. An uninterruptible power supply device comprising:
- an energy store; and
- a control module according to claim 1,
- wherein the control module for charging and discharging the energy store is configured for the uninterrupted power supply of at least one consumer connected to the supply line.

15. The uninterruptible power supply device according to claim 14, characterised in that:
- the control module comprises an automatic actuation apparatus, wherein an actuation occurs upon connection of the control module to the delimiting device, and the control unit is configured, upon actuation of the actuation apparatus, to perform a rapid charging and/or a rapid discharging of the energy store; and
- the uninterruptible power supply device comprises a delimiting device, wherein the delimiting device is configured for the automatic actuation of the actuation apparatus when connected to the control module.

16. The control module according to claim 3, characterised in that the switch comprises a semiconductor switch, which is configured with at least one bipolar transistor, a field-effect transistor or an insulated gate bipolar transistor.

17. The control module according to claim 16, characterised in that the switch is configured as a unidirectional switch.

18. The control module according to claim 2, characterised in that the energy store comprises a chemical energy store, in particular a lead battery or an NiMH battery, or a capacitor module.

19. The control module according to claim 3, characterised in that the energy store comprises a chemical energy store, in particular a lead battery or an NiMH battery, or a capacitor module.

20. The control module according to claim 4, characterised in that the energy store comprises a chemical energy store, in particular a lead battery or an NiMH battery, or a capacitor module.

* * * * *